United States Patent [19]
Delatorre

[11] Patent Number: 5,974,894
[45] Date of Patent: Nov. 2, 1999

[54] FUSED SILICA HIGH PRESSURE SENSOR

[75] Inventor: Leroy C Delatorre, Sugar Land, Tex.

[73] Assignee: Panex Incorporated, Fort Bend, Tex.

[21] Appl. No.: 09/113,896

[22] Filed: Jul. 13, 1998

Related U.S. Application Data

[60] Provisional application No. 60/052,428, Jul. 14, 1997.
[51] Int. Cl.⁶ .................................................. G01L 9/12
[52] U.S. Cl. ............................................ 73/718; 361/283.4
[58] Field of Search ................... 73/718, 724; 361/283.4

[56] References Cited

U.S. PATENT DOCUMENTS 4,924,701  5/1990  Delatorre ................... 361/283.4 X
5,357,806  10/1994  Dennis et al. ................... 73/718

*Primary Examiner*—Joseph L. Felber
*Attorney, Agent, or Firm*—Donald H. Fioler

[57] ABSTRACT

A basic pressure sensor of four fused silica discs and two defined interior cavities. The discs are bonded to one another by a cold metal film metallization. The film metallization in spaced apart discs define capacitor electrodes where a central metallization film is a common electrode and the other metallization films define separate capacitor electrodes.

For a high pressure capacitance pressure sensor, end cap discs are relatively thick and are supported by an annular ring surface on interior discs which also have a small central cavity. Pressure acting on the discs develops compressive forces which change the volume of the central cavities and the capacitance as a function of pressure.

For low pressure capacitance pressure sensors, the end caps are relatively thin and flex to change a capacitance relationship defined by the bonding films. A reference capacitor can be incorporated by use of an additional electrode disc.

6 Claims, 3 Drawing Sheets

FUSED SILICA HIGH PRESSURE SENSOR

This application claim benefit of Provisional Application 60/052,428 filed Jul. 14, 1997.

FIELD OF THE INVENTION

This invention relates to high or low quartz pressure sensors and more particularly to small diameter high pressure capacitance pressure sensors which use fused silica quartz.

BACKGROUND OF THE INVENTION

It is well known that fused silica quartz has exceptional elastic characteristics that make it capable of being the basis for high accuracy pressure sensors. Its well known limitations, however, are fragility and low effective tensile strength. This becomes particularly critical in designing diaphragm operated high pressure capacitor sensors since any usable deflection of a diaphragm is also accompanied by stress levels in the diaphragm which can cause failure in the diaphragm material. The stress occurs when a diaphragm bends and develops compression and tensile forces in the quartz.

Another problem in constructing fused silica pressure sensors is bonding of quartz members to one another. Glass frits are generally used for this purpose but they have inferior properties relative to the properties of quartz silica. Glass frits also introduce temperature dependent stresses in the quartz because their expansion characteristics are significantly different from the extremely low values exhibited by fused silica quartz. Additionally, the glasses that are most suitable for bonding fused silica fire at very high temperatures (900 degrees Centigrade) and where metal films are utilized there is a great likelihood that extreme degradation of metal films used in the construction will occur.

It is an object of this invention to circumvent all of these limitations and create a low cost, high pressure, fused silica capacitance pressure sensor. The design also lends itself to low pressure sensor fabrication.

SUMMARY OF THE PRESENT INVENTION

In the present invention, a basic pressure sensor consists of four fused silica discs and two defined interior cavities. The discs are bonded to one another by a cold metal film metallization. The film metallization in spaced apart discs define capacitor electrodes where a central metallization film is a common electrode and the other metallization films define separate capacitor electrodes.

For a high pressure capacitance pressure sensor, end cap discs are relatively thick and are supported by an annular ring surface on interior discs which also have a small central cavity. Pressure acting on the discs develops compressive forces which change the volume of the central cavities and the capacitance as a function of pressure.

For low pressure capacitance pressure sensors, the end caps are relatively thin and flex to change a capacitance relationship defined by the bonding films. A reference capacitor can be incorporated by use of an additional electrode disc.

DESCRIPTIONS OF THE DRAWINGS

DESCRIPTION OF THE INVENTION

Figure 1:
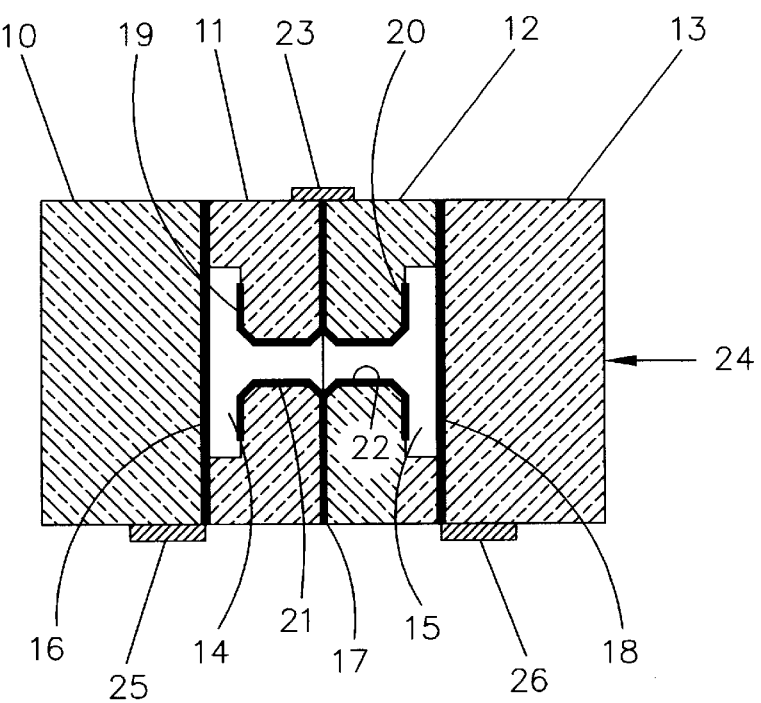
FIG. 1 is a view in cross section of a pressure sensor according to the present invention.

Referring now to FIG. 1, a basic pressure sensor, 24, designed to be totally immersed in a pressure media is illustrated in cross-section. The sensor 24 consists of a bonded stack of four fused silica cylindrically shaped discs, 10,11,12, and 13. There are two defined interior cavities 14 and 15 in the discs 11 and 12. The discs are attached to one another by metallization bonds, 16, 17 and 18 located between discs. The bonds are cold welded thin film metallizations which introduce very low residual stress into the structure because a bond is extremely thin (on the order of 15 micro inches). The bond metalization process is disclosed in pending U.S. application Ser. No. 09/214,424 which is based upon PCT Application 97/11193 and provisional application 60/021,047 filed Jul. 6, 1996. The metalization bonds are also made in a vacuum at a relatively low 300–350 degrees Centigrade and therefore the bonding process does not degrade other films on the structure.

The cavities, 14 and 15, are etched or ground into the faces of center discs 11 and 12 and each disc 11 and 12 has a central film bore 21 and 22.

A circular thin film electrode 19 and 20 is centrally located in a cavity. The electrodes 19 and 20 are connected by means of metal plating through the bores 21 and 22 to a metalization bond 17. The metalization bond, 17 connects to metallization film termination pad 23 located on the outside edge of the sensor 24. The metallization film termination pad 23 is used as a common termination for connection of the electrodes 19 and 20 to an external oscillator circuit.

Metalization bonds 16 and 18 are formed by thin films (not shown) and; applied across the entire polished faces of end caps 10 and 13. The metallization bonds 16 and 18 form the opposing electrodes of a capacitor for each cavity 14 and 15. The films 16 and 18 are brought out to termination pads 25 and 26 on the exterior of the discs. The termination pads provide a connection of the bonds 16 and 18 to the oscillator circuit. The contacting face surfaces of discs 11 and 12 are also connected with a metallized bond as part of the bonding procedure shown in a bonded condition in FIG. 1 and these metallizations are connected to metallizations 19 and 20. The process for cold metal bonding is disclosed in a pending U.S. application Ser. No. 60/021,407 filed Jul. 9, 1996 and in PCT application 97/11,193, filed Jul. 1, 1997 and now in U.S. Ser. No. 09/214,425. The metalization bonds between disc surfaces introduce very small effects into the sensor structure by virtue of their thinness. The metalization bonds, however, are made up of low strength materials which will cold weld (such as copper or gold) and therefore are subject to yielding if shear forces are applied. Large compressive forces will also cause yielding but the dimensional effects of this type stress are small because of the thinness of the yielding bond layer. Further, yielding of this type will occur in localized areas because of the lack of absolute flatness of the quartz surface when considering the micro inch dimensions of the bond. Yielding will cause material flow which will eventually trap the flowing material in pockets formed due to the lack of absolute flatness.

It can be easily appreciated that the center metalization bond 17 between the discs 11 and 12 has no shear forces acting on it because of the symmetrical arrangement. The forces (due to pressure) are applied to discs 11 and 12 from discs 10 and 13 and are alike in every direction because the end caps 10 and 13 are identical. Also, if discs 11 and 12 are chosen to be equal, then the metalization bond 17 lies on the neutral axis and there will be no shear force in it.

The end caps 10 and 13 are chosen to be thick for high pressure applications. As such, very little bending occurs in them and the bending stresses in them are therefore kept small. The bending tensile stresses are maximum in the center on the cavity side of these caps 10 & 13. Since the end caps have a smooth surface, with no holes, etc., then a good design maximum for the bonding tensile stress is about 7,000 PSI. Bending is controlled, then, by setting a minimum thickness for the end caps based on this criteria and the maximum pressure. This also results in minimum shear stress levels in the bonds between discs.

When pressure is applied for a high pressure designed sensor, very little bending occurs in the end caps, by design. This means another mechanism must be used to change the spacing and corresponding capacitance between the electrodes, 16 and 19 and 18 and 20. This mechanism is the compressibility of quartz, itself.

Figure 2:
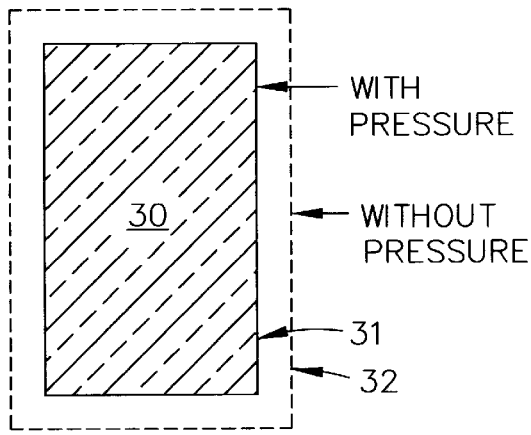
FIG. 2 is an illustration of the effect of pressure on a quartz block.

Quartz fused silica has a relatively low modulus of elasticity (10.5 million PSI) and therefore compressibility effects become substantial at the pressures of this design (greater than approximately 5000 PSI). Referring now to FIG. 2, this effect is shown on a quartz block 30 as a uniform dimensional shrinkage 31 (solid line) for a uniform overall hydrostatic pressure from a original dimension 32 (dashed line).

Figure 3:
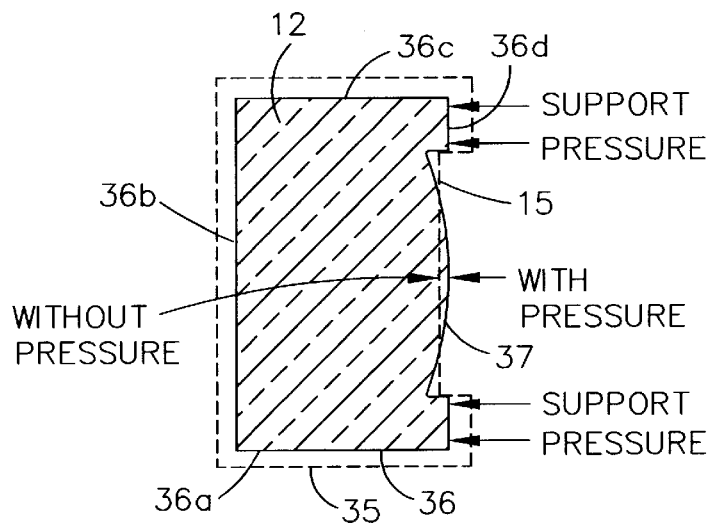
FIG. 3 is an illustration of the effect of pressure on a quartz block with a cavity.

FIG. 3 shows the effect for the pressure loading on a central disc 12 by an end cap 13 (see FIG. 1 also) (neglecting bending). The original dimension 35 (dashed line) compresses with uniform external pressure on the surfaces 36 (*a–d*) and a balancing support pressure around the edge surface 36*d* defining the cavity 15. With no pressure in the cavity 15, surface material 37 displaced into the cavity (solid line), as shown.

Figure 4:
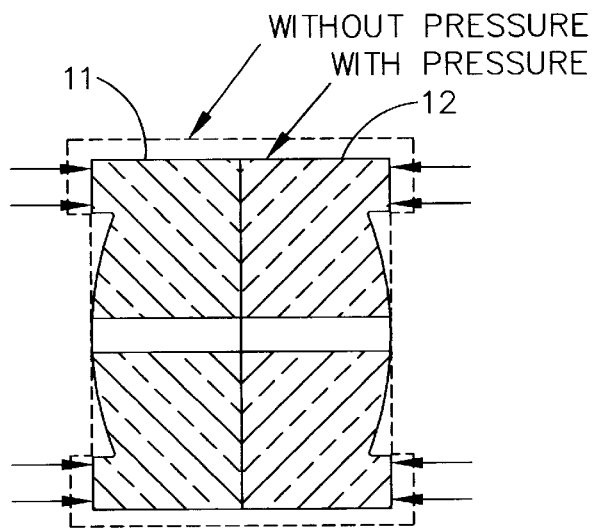
FIG. 4 is an illustration of the effect of pressure on a quartz block with two cavities.
Figure 5:
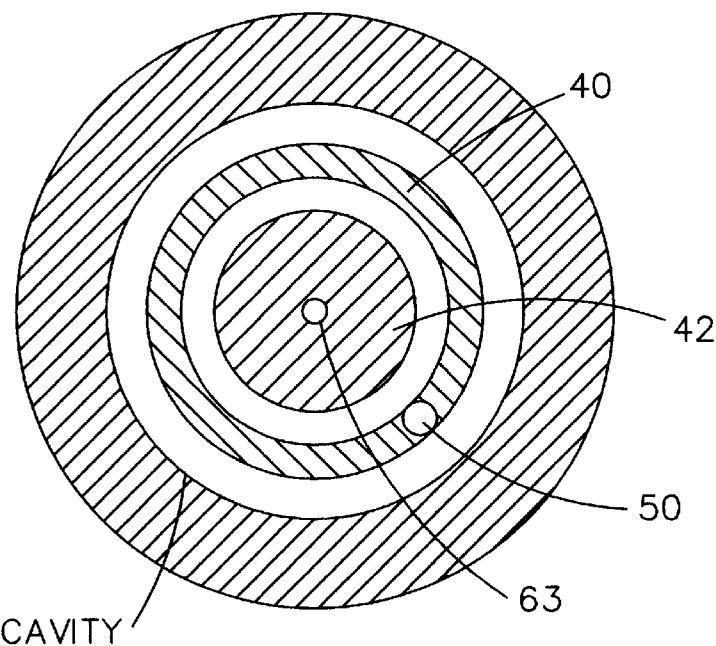
FIG. 5 is a view taken along line 5—5 of FIG. 6.
Figure 7:
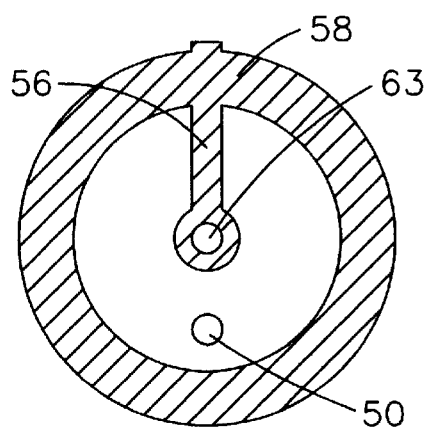
FIG. 7 is a view taken along line 7—7 of FIG. 6.

The same effect occurs on the center discs, 11 and 12, due to the pressure loading on the edges compressing the outside of the discs as shown in FIG. 4.

The gap between the electrodes, 16 and 19, and between electrodes 18 and 20, varies then as a function of applied pressure. This is true even if no bending occurs in the end caps. Any bending in the end caps will only add to the deflection due to compression. This is important for low pressure designs where compression effects fall off and stresses due to bending can be held to acceptable levels. A low pressure design, then, would be identical to the described high pressure design except that the end caps 10 and 13 are made relatively thin so that significant bending occurs. The deflection in a low pressure design, then is due to the more conventional diaphragm bending.

Figure 6:
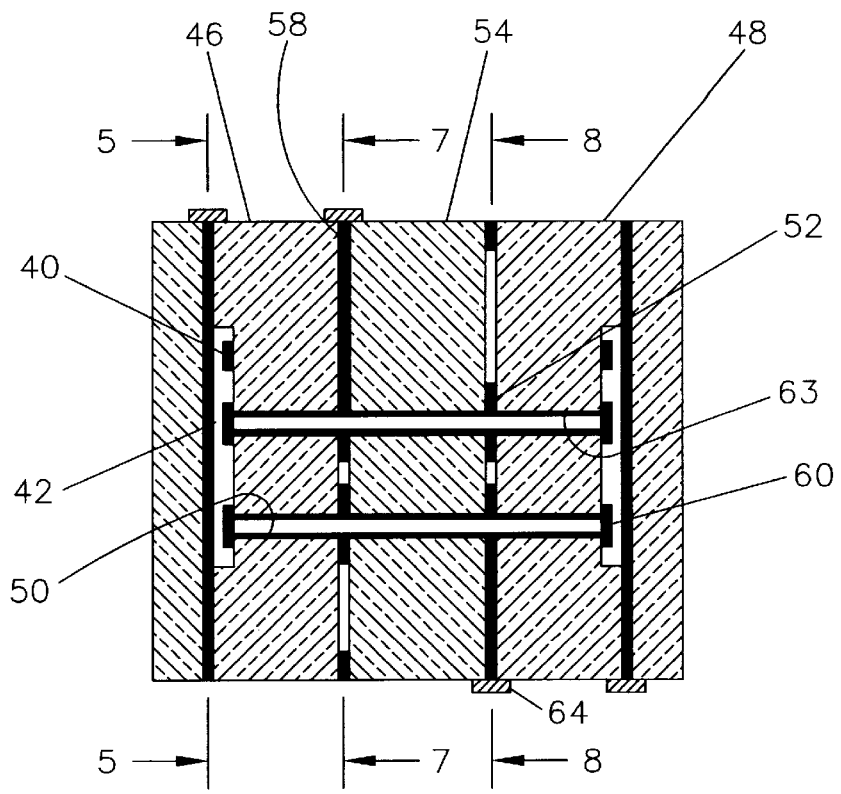
FIG. 6 is a view in cross-section of a modified form of the invention.
Figure 8:
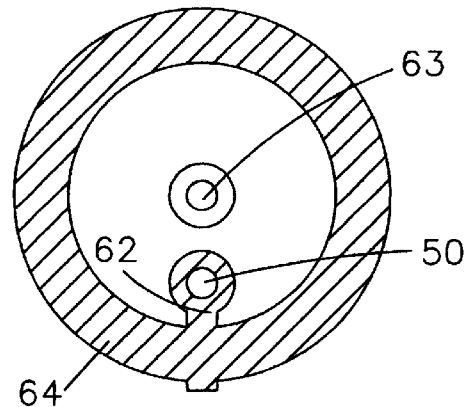
FIG. 8 is a view taken along line 8—8 of FIG. 6.

It is also possible to add a reference capacitance for low pressure designs. This is possible because the deflection of a thin diaphragm is near zero at the edges as opposed to the compression effects described above. The reference capacitance electrode, then, merely consists of an annular metalized ring 40 which is located around a center electrode 42 in a recess of a quartz disc 46. The quartz disc 48 is similarly configured to disc 46, as shown in FIG. 6. A feedthrough hole 50 is used to connect the ring 40 to an additional metalization bond 64 formed by adding another disc 54 in the center section. See FIG. 8. The metalization bond 64 connects to the hole 50 by a strip of metalization 62. Similarly a feedthrough hole 63 connects by a metalized strip 56 to an outer metalization bond 58.

An important aspect of this design is for the forces on the bond layer to always be kept under compressive loading. For the case of end cap bending (low pressure design), the edges of the end caps (diaphragms) will tend to pull away from the bond. This effect is due to the edge moment created by diaphragm bending and can be cancelled by making the outside diameter of the sensor sufficiently greater than the inside diameter of the cavity. External pressure acting on this supported diaphragm edge, then, will create an opposing moment to the one generated by bending. When the edge area is large enough for the opposing moment to become larger than the diaphragm edge moment then the entire bond area will stay under compression.

Fragility and cost are also addressed in this design by the very nature of the structure. The complete assembly is a solid block of quartz except for the very small internal cavities (generally less than 0.005 inches deep). Its ruggedness, then is as much as quartz can deliver in heavy sections.

Low cost is a consequence of an assembly made up of simple discs. Size can be reduced so that batch processing is feasible, including metallization sputtering and the bond operation.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A quartz pressure sensor construction including:
   a stack of at least four cylindrically shaped fused quartz elements with at least two elements defining first and second central sections and with the remaining two elements respectively defining first and second end sections, said sections being disposed along a central axis;
   each of said end sections and an adjacent central section respectively defining first and second cylindrically shaped cavities about said central axis where such cavities are located in a central section and define a circularly shaped transverse end surface and an annular end surface facing a transverse end surface of an end section, said adjacent central sections respectively having a central opening extending to the circularly shaped transverse end surfaces in the first and second cavities;
   first cold welded metalization bonds interconnecting the respective adjacent end surfaces of an end section and the respective adjacent annular end surfaces of a central section to one another, said first metal metalization bonds respectively including a metal film extending over the transverse end section in an area located in a facing relationship to the circularly shaped transverse end surface of an adjacent central section, said first metalization respectively having an external electrode connection, said metal film defining a first capacitor plate facing the circularly shaped transverse end surface in a cavity; and
   a second cold welded metalization bond interconnecting the respective adjacent surfaces of adjacent central sections to one another, said metalization bond having a metal film extending through said central openings and disposed on the circular shaped transverse end surface in a cavity for defining a second capacitor plate facing said first capacitor plate, said second cold weld metalization bonds having an external electrode connection.

2. The construction as set forth in claim 1 where said end sections have substantially equal thickness and said center sections have substantially equal thickness and said end sections are constructed and arranged with enough thickness so as to resist significant bending within the pressure range for which the pressure sensor was designed to be used.

3. The construction as set forth in claim 1 where said end sections have substantially equal thickness and said center sections have substantially equal thickness and said end sections are constructed and arranged with enough thinness so as to permit significant bending within the pressure range for which the pressure sensor was designed to be used.

4. A quartz pressure sensor construction including:

a stack of at least five cylindrically shaped fused quartz elements with at least three elements defining first, second and third central sections and with the remaining two elements respectively defining first and second end sections, said sections being disposed along a central axis;

each of said end sections and an adjacent central section respectively defining first and second cylindrically shaped cavities about said central axis where such cavities are located in a central section and define a circularly shaped transverse end surface and an annular end surface facing a transverse end surface of an end section, said central sections respectively having a central opening extending to the circularly shaped transverse end surfaces in the first and second cavities;

said central sections having aligned offset openings offset from said central openings and extending to the circularly shaped transverse end surfaces in the first and second cavities;

first cold welded metalization bonds interconnecting the respective adjacent end surfaces of an end section and the respective adjacent annular end surfaces of a central section to one another, said first cold welded metal metalization bonds each including a metal film extending over the transverse end section in an area located in a facing relationship to the annularly shaped transverse end surface of an adjacent central section and said first metalization bonds respectively having an external electrode connection, each of said metal films defining a first capacitor plate facing the annularly shaped transverse end surface in a cavity;

a second and a third cold welded metalization bond interconnecting the respective adjacent surfaces of adjacent central sections to one another;

one of said second and third metalization bonds having a metal film extending through said central openings and having a portion disposed on the annualar shaped transverse end surface in a cavity for defining a second capacitor plate facing the first capacitor plate;

the other of said second and third metalization bonds having a metal film extending through said offset openings and having a portion for defining a third capacitor plate facing one of said first capacitor plates whereby said pressure sensor incorporates dual capacitance devices in a common housing.

5. The construction as set forth in claim 4 where said end sections have substantially equal thickness and said center sections have substantially equal thickness and said end sections are constructed and arranged with enough thickness to resist significant bending within the pressure range for which the pressure sensor was designed to be used.

6. The construction as set forth in claim 4 where said end sections have substantially equal thickness and said center sections have substantially equal thickness and said end sections are constructed and arranged with enough thinness to permit significant bending within the pressure range for which the pressure sensor was designed to be used.

\* \* \* \* \*